US010069807B2

(12) United States Patent
Sun et al.

(10) Patent No.: US 10,069,807 B2
(45) Date of Patent: Sep. 4, 2018

(54) METHOD AND SYSTEM FOR ENCRYPTING DATA SYSTEM

(71) Applicant: LONTIUM SEMICONDUCTOR CORPORATION, Hefei, Anhui (CN)

(72) Inventors: Chao Sun, Hefei (CN); Jin Su, Hefei (CN); Hongfeng Xia, Hefei (CN)

(73) Assignee: LONTIUM SEMICONDUCTOR CORPORATION, Hefei, Anhui (CN)

( * ) Notice: Subject to any disclaimer, the term of this patent is extended or adjusted under 35 U.S.C. 154(b) by 149 days.

(21) Appl. No.: 15/220,627

(22) Filed: Jul. 27, 2016

(65) Prior Publication Data
US 2017/0195300 A1    Jul. 6, 2017

(30) Foreign Application Priority Data
Dec. 31, 2015   (CN) .......................... 2015 1 1033825

(51) Int. Cl.
*H04L 29/06* (2006.01)
*H04L 9/06* (2006.01)
(Continued)

(52) U.S. Cl.
CPC ........ *H04L 63/0457* (2013.01); *H04L 9/0625* (2013.01); *H04L 9/0861* (2013.01);
(Continued)

(58) Field of Classification Search
CPC . H04L 63/0457; H04L 9/0625; H04L 9/0861; H04N 21/2541; H04N 21/242;
(Continued)

(56) References Cited

U.S. PATENT DOCUMENTS 6,667,993 B1 * 12/2003 Lippett ............ H04L 25/03866
370/509
7,088,398 B1    8/2006 Wolf et al.
(Continued)

FOREIGN PATENT DOCUMENTS

TW          200708003 A       2/2007

OTHER PUBLICATIONS

Summary of the 1st Office Action for TW105123679, dated Aug. 18, 2017.
(Continued)

*Primary Examiner* — Michael Pyzocha
(74) *Attorney, Agent, or Firm* — U.S. Farisky LLP; Yue (Robert) Xu

(57) ABSTRACT

A method and a system for encrypting a data stream are provided. The method includes receiving a multimedia data stream including multiple data elements; dividing the multimedia data stream into M data sub-streams based on sequence of the multiple data elements in the multimedia data stream, where the M data sub-streams follow a synchronous clock period which is M times of a clock period of the multimedia data stream, where M is a positive integer greater than 1; and generating a key at a predetermined time interval with a new pipeline algorithm, and encrypting the data elements in the M data sub-streams with the key and the complicated control logic, and the predetermined time interval is N times of the clock period of the M data sub-streams, where N is a positive integer.

14 Claims, 6 Drawing Sheets

(51) Int. Cl.
 *H04L 9/08* (2006.01)
 *H04N 21/2347* (2011.01)
 *H04N 21/242* (2011.01)
 *H04N 21/4627* (2011.01)
 *H04N 21/254* (2011.01)
 *H04N 21/43* (2011.01)
(52) U.S. Cl.
 CPC ....... *H04N 21/2347* (2013.01); *H04N 21/242* (2013.01); *H04N 21/2541* (2013.01); *H04N 21/4302* (2013.01); *H04N 21/4627* (2013.01)
(58) Field of Classification Search
 CPC ........... H04N 21/2347; H04N 21/4302; H04N 21/4627
 See application file for complete search history.

(56) References Cited

U.S. PATENT DOCUMENTS

| | | | | |
|---|---|---|---|---|
| 7,599,439 | B2 | 10/2009 | Lavelle | |
| 8,325,916 | B2* | 12/2012 | Oliveira | H04N 7/1675 380/200 |
| 2006/0280301 | A1* | 12/2006 | Oliveira | H04N 7/1675 380/212 |
| 2007/0268362 | A1* | 11/2007 | West | H04N 21/234327 348/14.15 |
| 2009/0100495 | A1* | 4/2009 | Manapragada | H04L 65/607 725/138 |
| 2010/0202467 | A1* | 8/2010 | Otani | G06F 1/3203 370/401 |
| 2011/0299678 | A1* | 12/2011 | Deas | H04L 9/003 380/28 |
| 2012/0020475 | A1* | 1/2012 | Altmann | H04N 21/23476 380/42 |
| 2012/0201328 | A1* | 8/2012 | Fuss | H04H 20/57 375/295 |
| 2014/0119542 | A1* | 5/2014 | Sato | H04N 21/234327 380/200 |
| 2015/0288919 | A1 | 10/2015 | Labosco | |

OTHER PUBLICATIONS

Summary of the 1st Office Action for TW105123679, dated Apr. 18, 2018.

* cited by examiner

METHOD AND SYSTEM FOR ENCRYPTING DATA SYSTEM

CROSS REFERENCE OF RELATED APPLICATION

The present application claims priority to Chinese Patent Application No. 201511033825.4, titled "METHOD AND SYSTEM FOR ENCRYPTING DATA STREAM", filed on Dec. 31, 2015 with the State Intellectual Property Office of People's Republic of China, which is incorporated herein by reference in its entirety.

FIELD

The present disclosure relates to the technical field of data communications, and in particular to a method and a system for encrypting a data stream.

BACKGROUND

The technology of High Definition Multimedia Interface, which is abbreviated as HDMI, may be adopted to provide a high bandwidth and transmit digital video signals and audio signals simultaneously without loss. Therefore, HDMI has been widely applied to various consumptive electronic devices and has been developed to a current specification version of HDMI 2.0.

The technology of High-bandwidth Digital Content Protection, which is abbreviated as HDCP, is proposed for protecting high definition signals transmitted with HDMI from being illegally recorded. HDCP is adopted to encrypt HDMI signals. In a case that a user illegally reproduces the encrypted content, the reproduced video file will have a reduced quality due to the use of HDCP, and thereby high definition multimedia content in the video file is protected. HDCP has been developed to a current specification version of HDCP 2.2.

However, in encrypting signals of HDMI 2.0, it is required according to HDCP 2.2 that a clock of a digital circuit operates at a frequency of 600 MHz. In order to cause a clock of a digital circuit to operate at a frequency of 600 as required by the structure and algorithm of HDMI 2.0 and HDCP 2.2, the digital circuit has to be taped out with a deep submicron process, resulting in a high cost, complicated implementation and difficult development.

SUMMARY

A method and a system for encrypting a data stream are provided according to the present disclosure, for reducing the cost for encrypting signals of HDMI 2.0 with HDCP 2.2, simplifying the implementation and lowering the difficulty of development.

In order to solve the above technical problem, the following technical solutions are provided according to the present disclosure.

A method for encrypting a data stream, includes:

receiving a multimedia data stream including multiple data elements;

dividing the multimedia data stream into M data sub-streams based on sequence of the multiple data elements in the multimedia data stream, where the M data sub-streams follow a synchronous clock period which is M times of a clock period of the multimedia data stream, where M is a positive integer greater than 1; and generating a key at a predetermined time interval, and encrypting the data elements in the M data sub-streams with the key, where the predetermined time interval is N times of the clock period of the M data sub-streams, where N is a positive integer.

Preferably, M may be set to be 2; and the dividing the multimedia data stream into M data sub-streams based on sequence of the multiple data elements in the multimedia data stream may include:

determining the data elements at odd positions in the multimedia data stream and the data elements at even positions in the multimedia data stream based on the sequence of the multiple data elements in the multimedia data stream; and grouping the data elements at odd positions in the multimedia data stream into a first data sub-stream, and grouping the data elements at even positions in the multimedia data stream into a second data sub-stream.

Preferably, the generating a key at a predetermined time interval and encrypting the data elements in the M data sub-streams with the key may include:

generating the key at the predetermined time interval starting from a first clock period of the data sub-stream, and encrypting the multiple data elements with the generated key based on the sequence of the multiple data elements in the multimedia data stream, where S data elements of the multiple data elements are encrypted each time, where S is a positive integer.

Preferably, N may be set to be 2 and 3 alternately, and S may be set to be 5.

Preferably, each of the data sub-streams may include video data, audio data, auxiliary data and control data, and the video data may include video components of R, G and B, or video components of Y, Cb and Cr.

A system for encrypting a data stream, includes:

a receiving module configured to receive a multimedia data stream including multiple data elements;

a dividing module configured to divide the multimedia data stream into M data sub-streams based on sequence of the multiple data elements in the multimedia data stream, where the M data sub-streams follow a synchronous clock period which is M times of a clock period of the multimedia data stream, where M is a positive integer greater than 1; and an encrypting module configured to generate a key at a predetermined time interval, and encrypt the data elements in the M data sub-streams with the key, where the predetermined time interval is N times of the clock period of the M data sub-streams, where N is a positive integer.

Preferably, M may be set to be 2; and the dividing module may include:

a determining unit configured to determine the data elements at odd positions in the multimedia data stream and the data elements at even positions in the multimedia data stream based on the sequence of the multiple data elements in the multimedia data stream; and a grouping unit configured to group the data elements at odd positions in the multimedia data stream into a first data sub-stream, and group the data elements at even positions in the multimedia data stream into a second data sub-stream.

Preferably, the encrypting module may be configured to:

generate the key at the predetermined time interval starting from a first clock period of the data sub-stream, and encrypt the multiple data elements with the generated key based on the sequence of the multiple data elements in the multimedia data stream, where S data elements of the multiple data elements are encrypted each time, where S is a positive integer.

Preferably, N may be set to be 2 and 3 alternately, and S may be set to be 5.

Preferably, each of the data sub-streams may include video data, audio data, auxiliary data and control data, and the video data may include video components of R, G and B, or video components of Y, Cb and Cr.

In the method and the system for encrypting a data stream provided according to the embodiments of the present disclosure, a multimedia data stream including multiple data elements is received. The multimedia data stream is divided into M data sub-streams based on sequence of the multiple data elements in the multimedia data stream. The M data sub-streams follow a synchronous clock period which is M times of a clock period of the multimedia data stream, where M is a positive integer greater than 1. A key is generated at a predetermined time interval, and the data elements in the M data sub-streams are encrypted with the key. The predetermined time interval is N times of the clock period of the M data sub-streams, where N is a positive integer. It follows that, with the technical solution provided according to the present disclosure, the multimedia data stream is divided into M data sub-streams following a clock period which is M times of a clock period of the multimedia data stream, and then the data elements in the M data sub-streams are encrypted with the key. In this way, the data elements can be encrypted with a clock frequency lower than the clock frequency of the multimedia data stream. Therefore, the encryption can be performed with a process having lower requirements, thereby reducing the cost of a process for encrypting signals of HDMI 2.0 with MCP 2.2, simplifying the implementation and lowering the difficulty of development.

BRIEF DESCRIPTION OF THE DRAWINGS

The accompanying drawings to be used in the description of the embodiments or the conventional technology are described briefly as follows, so that the technical solutions according to the embodiments of the present disclosure or according to the conventional technology become clearer. It is apparent that the accompanying drawings in the following description are only some embodiments of the present disclosure. For those skilled in the art, other accompanying drawings may be obtained according to these accompanying drawings without any creative work.

DETAILED DESCRIPTION OF EMBODIMENTS

In order to make the object, technical solution and advantages of the present disclosure more clear, the technical solution is described clearly and completely as follows with embodiments in conjunction with the accompanying drawings for the embodiments of the present disclosure. It is apparent that the described embodiments are only a part of the embodiments of the present disclosure. All the other embodiments obtained by those skilled in the art based on the embodiments of the present disclosure without any creative work fall into the scope of the present disclosure.

The technical solutions are described in detail in conjunction with the accompanying drawings as follows.

Figure 1:
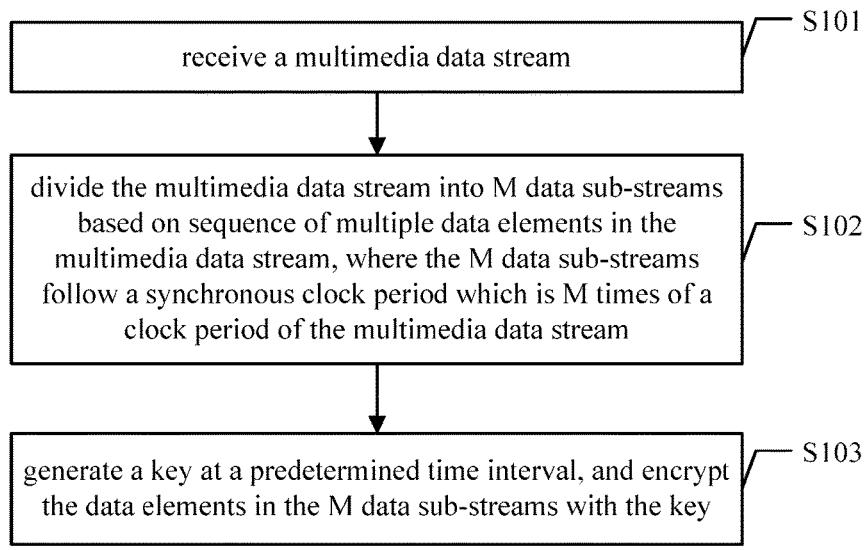
FIG. 1 is a schematic flowchart of a method for encrypting a data stream according to an embodiment of the present disclosure.

FIG. 1 is a schematic flowchart of a method for encrypting a data stream according to an embodiment of the present disclosure.

Referring to FIG. 1, the method for encrypting a data stream provided according to the embodiment of the present disclosure is applied in a system for encrypting a data stream, and includes step S101 to step S103 as follows.

Step S101 includes receiving a multimedia data stream.

In the embodiment of the disclosure, the multimedia data stream refers to a multimedia data stream which is obtained by multiplexing video data, audio data, auxiliary data and control data before being inputted to a processor of HDCP 2.2. The multimedia data stream includes multiple data elements. Each of the data sub-streams includes video data, audio data, auxiliary data and control data. The video data of various multimedia data streams may include video components of R, G and B, or video components of Y, Cb and Cr. The data elements in the multimedia data stream may be encrypted after the multimedia data stream is inputted to the processor of HDCP 2.2.

Step S102 includes dividing the multimedia data stream into M data sub-streams based on sequence of the multiple data elements in the multimedia data stream. The M data sub-streams follow a synchronous clock period which is M times of a clock period of the multimedia data stream.

In an embodiment of the disclosure, M is a positive integer greater than 1, such as 2, 3, 4 or 5. Since the clock period of the M data sub-streams is M times of the clock period of the multimedia data stream, that is, a clock frequency of the M data sub-streams is 1/M of a clock frequency of the multimedia data stream, the original clock frequency of the multimedia data stream is decreased by dividing the multimedia data stream into the M data sub-streams, thereby encrypting the data elements with a process of lower requirements.

In encrypting multimedia data streams of different clock frequencies, the value of M may be set differently, so that the decreased clock frequency meets lower processing requirements.

Step S103 includes generating a key at a predetermined time interval, and encrypting the data elements in the M data sub-streams with the key.

In an embodiment of the disclosure, the time interval is N times of the clock period of the data sub-streams, where N is positive integer, such as 1, 2 or 3. Each of the data sub-streams includes video data, audio data, auxiliary data and control data, which are all to be split and encrypted. For encrypting different types of data, N may be set differently. And the key for encrypting different types of data may have different number of bits. However, all the keys are produced in a same manner.

In an embodiment of the disclosure, the step of encrypting the data elements in the M data sub-streams with the key may include generating the key at the predetermined time interval starting from a first clock period of the data sub-stream, and encrypting the multiple data elements with the generated key based on the sequence of the multiple data elements in the multimedia data stream. S data elements of the multiple data elements are encrypted each time, where S is a positive integer, and S is 5 in HDMI 2.0. That is, in encrypting the data elements with the key, several data elements may be encrypted in a same one process with a same generated key at the predetermined time interval. In this way, the process of encrypting data elements in the multiple data sub-streams having a lower clock frequency obtained by dividing the multimedia data stream can have a same effect as a process of encrypting data elements in the multimedia data stream having a higher clock frequency.

In the method for encrypting a data stream provided according to an embodiment of the present disclosure, a multimedia data stream including multiple data elements is received. The multimedia data stream is divided into M data sub-streams based on sequence of the multiple data elements in the multimedia data stream. The M data sub-streams follow a synchronous clock period which is M times of a clock period of the multimedia data stream, where M is a positive integer greater than 1. A key is generated at a predetermined time interval, and the data elements in the M data sub-streams are encrypted with the key. The predetermined time interval is N times of the clock period of the M data sub-streams, where N is a positive integer. It follows that, with the technical solution provided according to the present disclosure, the multimedia data stream is divided into M data sub-streams following a clock period which is M times of a clock period of the multimedia data stream, and then the data elements in the M data sub-streams are encrypted with the key. In this way, the data elements can be encrypted with a clock frequency lower than the clock frequency of the multimedia data stream. Therefore, the encryption can be performed with a process having lower requirements, thereby reducing the cost of a process for encrypting signals of HDMI 2.0 by HDCP 2.2, simplifying the implementation and lowering the difficulty of development.

Figure 2:
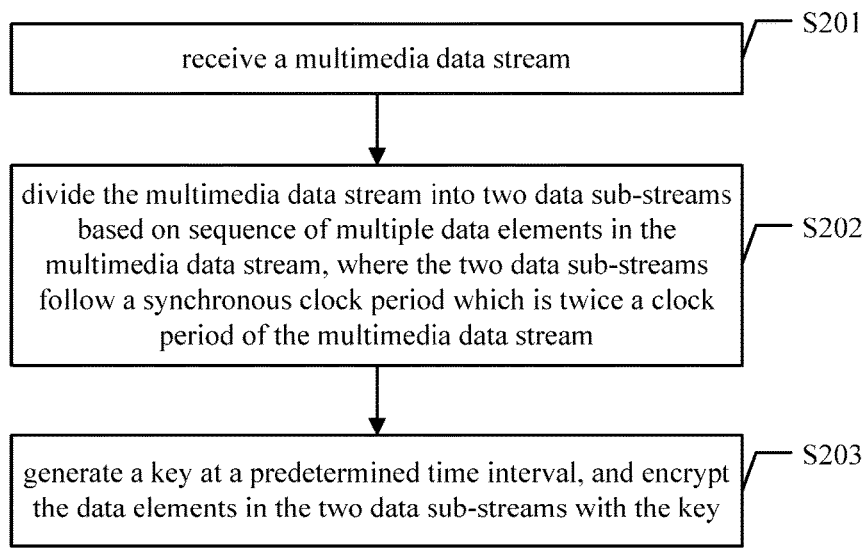
FIG. 2 is a schematic flowchart of a method for encrypting a data stream according to another embodiment of the present disclosure.

FIG. 2 is a schematic flowchart of a method for encrypting a data stream according to another embodiment of the present disclosure.

Referring to FIG. 2, the method for encrypting a data stream provided according to the embodiment of the present disclosure is applied in a system for encrypting a data stream. On the basis of the above embodiment, the multimedia data stream is divided into two data sub-streams according to an embodiment of the present disclosure. That is, M in the above embodiment is set to be 2. The method according to the embodiment of the present disclosure includes step S201 to step S203.

Step S201 includes receiving a multimedia data stream.

In an embodiment of the disclosure, the multimedia data stream includes multiple data elements. Each of the data sub-streams includes video data, audio data, auxiliary data and control data. The video data of various multimedia data streams may include video components of R, G and B, or video components of Y, Cb and Cr.

In the embodiment of the disclosure, the multimedia data stream refers to a multimedia data stream which is obtained by multiplexing video data, audio data, auxiliary data and control data before being inputted to a processor of HDCP 2.2. The data elements in the multimedia data stream may be encrypted after the multimedia data stream is inputted to the processor of HDCP 2.2.

Step S202 includes dividing the multimedia data stream into two data sub-streams based on sequence of the multiple data elements in the multimedia data stream. The two data sub-streams follow a synchronous clock period which is twice a clock period of the multimedia data stream.

Figure 3:
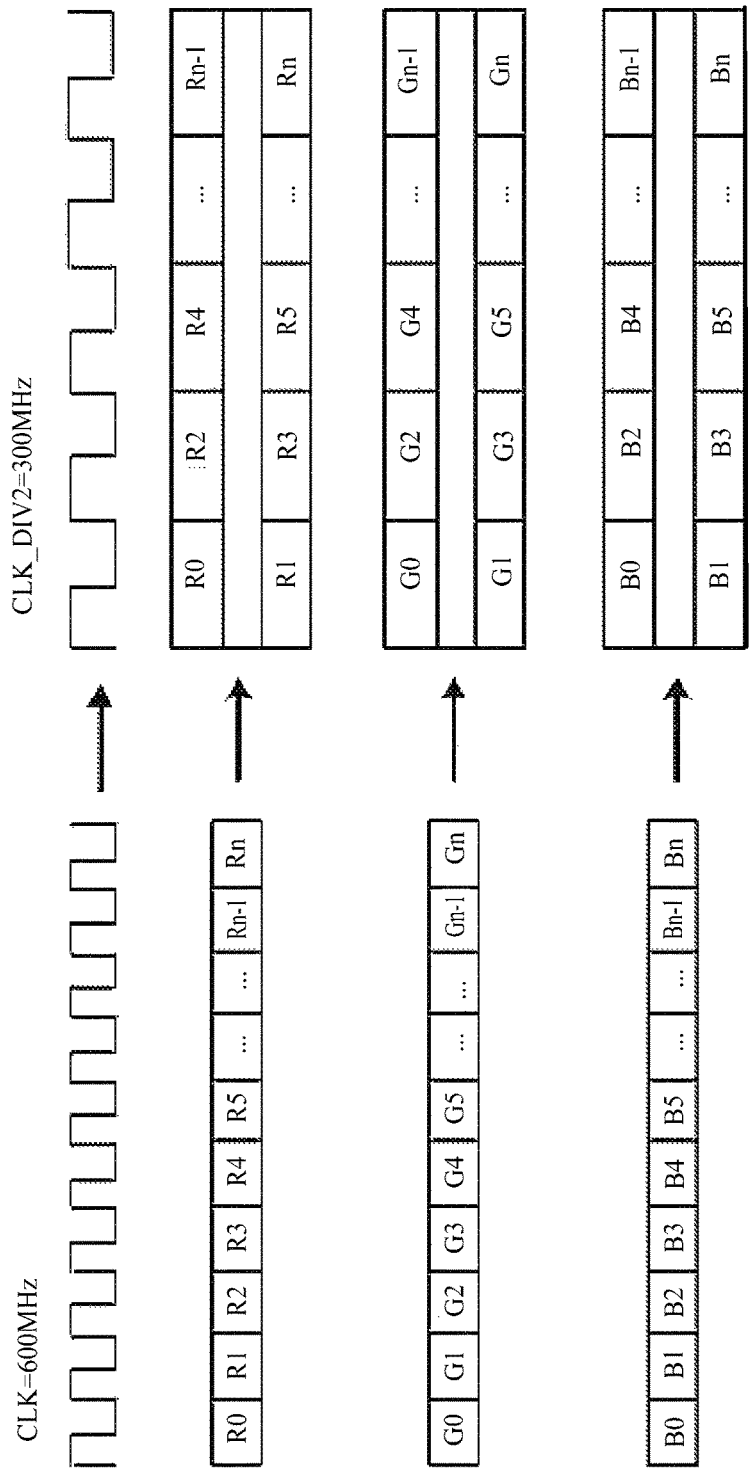
FIG. 3 is a schematic diagram of a mapping relation for dividing a multimedia data stream into data sub-streams according to an embodiment of the present disclosure.

Reference is made to FIG. 3, which is a schematic diagram of a mapping relation for dividing a multimedia data stream into data sub-streams. In an embodiment of the disclosure, the multimedia data stream having a clock frequency of 600 MHz is taken as an example. The multimedia data stream is divided into two, i.e., odd and even, data sub-streams having a clock frequency of 300 MHz. The process of dividing the multimedia data stream into two data sub-streams may include determining the data elements at odd positions in the multimedia data stream and the data elements at even positions in the multimedia data stream based on the sequence of the multiple data elements in the multimedia data stream, grouping the data elements at odd positions in the multimedia data stream into a first data sub-stream, and grouping the data elements at even positions in the multimedia data stream into a second data sub-stream.

For HDMI 2.0, in transmitting a multimedia data stream with a resolution and frame rate of 4K/60 Hz, a color depth being represented by 24 bits and data of R, G and B (or Y, Cb and Cr) each being represented by 8 bits, a clock of a digital circuit operates at a frequency of 600 MHz, and the digital circuit should be taped out with a deep submicron process. However, if the digital circuit is taped out with a process of 0.18 μm, the above function cannot be achieved because the clock of the digital circuit operates at a frequency up to only about 300 MHz. Therefore, the 24-bit multimedia data stream with components of R, G and B (or Y, Cb and Cr) is divided into two 24-bit data sub-streams based on odd positions and even positions of the data elements. Moreover, structure of data channel is adjusted and a new encrypting algorithm is adopted, so that data is encrypted and other processes are performed at a clock frequency which is a half of the original clock frequency. In this way, the encryption may be performed with a process of lower requirements.

Step S203 includes generating a key at a predetermined time interval, and encrypting the data elements in the two data sub-streams with the key.

The predetermined time interval is N times of the clock period of the data sub-streams. In an embodiment of the disclosure, N is set to be 2 and 3 alternately. The process of encrypting the data elements in the two data sub-streams with the key may include generating the key every two clock periods or three clock periods starting from a first clock period of the data sub-stream, and encrypting the multiple data elements with the generated key based on the sequence of the multiple data elements in the multimedia data stream. S data elements of the multiple data elements are encrypted each time. In an embodiment of the disclosure, S may be set to be 5.

Figure 4:
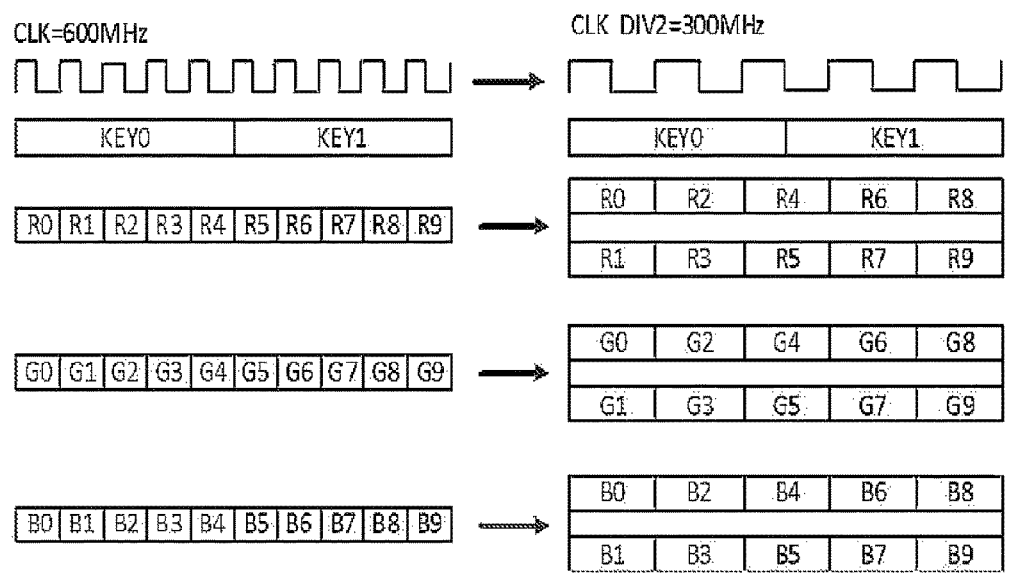
FIG. 4 is a schematic diagram of a process for encrypting data elements in multiple data sub-streams according to an embodiment of the present disclosure.

As shown in FIG. 3 or FIG. 4, a key KEY0 for encrypting 5 data elements is generated in a first clock period of CLK_DIV2 of a data sub-stream. After that, a key is generated every two clock periods or three clock periods. If a current key is generated every two clock periods, a next key is generated every three clock periods. In this way, keys are generated at time intervals alternating between two clock periods and three clock periods. For example, a first KEY1 is generated in a fourth clock period of a data sub-stream, a second KEY2 is generated in a sixth clock period of the data sub-stream, a third KEY3 is generated in a ninth clock period of the data sub-stream, and then a fourth KEY4 is generated in an eleventh clock period of the data sub-stream, and so on.

Reference is made to FIG. 4, which is a schematic diagram of a process for encrypting data elements in multiple data sub-streams according to an embodiment of the present disclosure. FIG. 4 illustrates correspondence between data elements, clock periods and keys by taking 10 data elements as an example. Compared with encrypting the multimedia data stream, in encrypting the two data sub-streams, each key is used for encrypting two data elements in the first data sub-stream and three data elements in the second data sub-stream, or is used for encrypting three data elements in the first data sub-stream and two data elements in the second data sub-stream (in encrypting the multimedia data stream, each key is used for encrypting five data elements in the multimedia data stream). In this way, the process of encrypting data elements in the multiple data sub-streams having a lower clock frequency obtained by dividing the multimedia data stream can have a same effect as the process of encrypting data elements in the multimedia data stream having a higher clock frequency.

Figure 5:
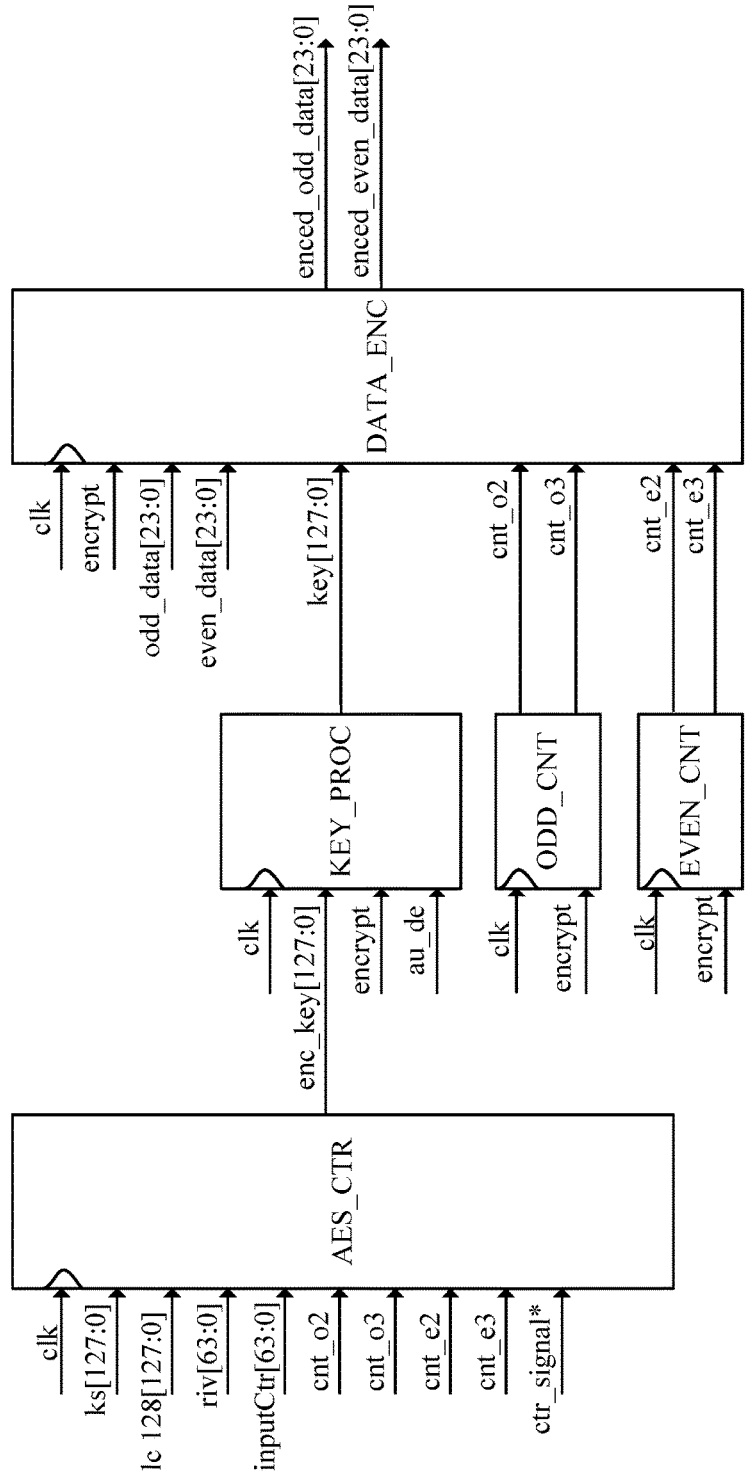
FIG. 5 is a framework schematic diagram of an encrypting process according to an embodiment of the present disclosure.

A focus of the present embodiment lies in how to produce the key for encrypting data. FIG. 5 is a framework schematic diagram of an encrypting process according to an embodiment of the present disclosure, and FIG. 6 is a procedure schematic diagram of an encrypting process according to an embodiment of the present disclosure.

Figure 6:
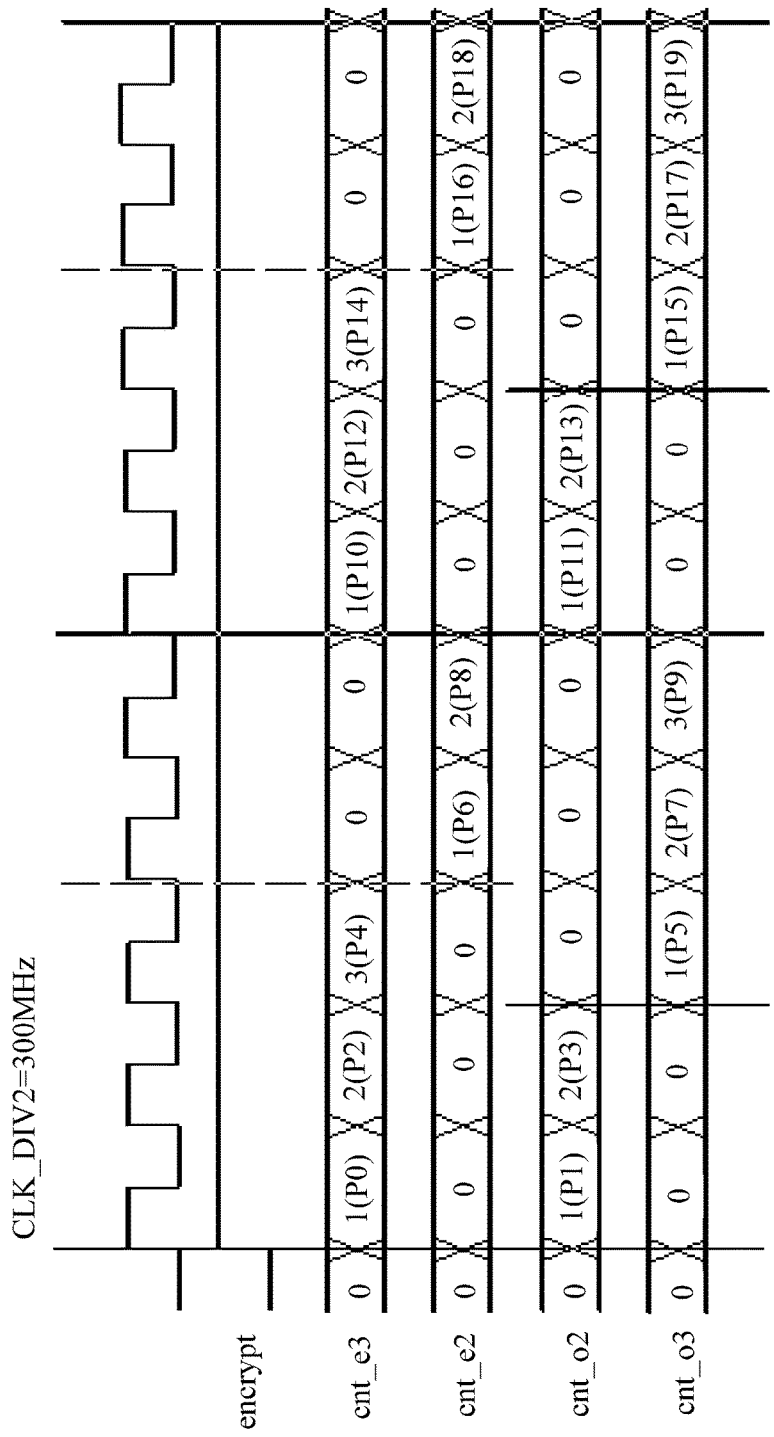
FIG. 6 is a procedure schematic diagram of an encrypting process according to an embodiment of the present disclosure.

Referring to FIG. 5 and FIG. 6, in the embodiment, a key generating module AES_CRT generates a key KEY0 in the first clock period of CLK_DIV2 for encrypting data of the first five pixels P0 to P4, then generates a key KEY1 in the fourth clock period of CLK_DIV2 for encrypting data of next five pixels P5 to P9, then generates a key KEY2 in the sixth clock period of CLK_DIV2 for encrypting data of five pixels P10 to P14, and then generates a key KEY3 in the ninth clock period of CLK_DIV2 for encrypting data of five pixels P15 to P19, which procedure is repeated until all the pixels are encrypted.

It should be noted that, two keys KEY0 and KEY1 are used in the third clock period of CLK-DIV2 of the data sub-streams as shown in FIG. 4 and FIG. 6. That is, KEY0 is used for encrypting three video components R4, G4 and B4 of the fifth pixel, and KEY1 is used for encrypting three video components R5, G5 and B5 of the sixth pixel. In an embodiment of the disclosure, in order to ensure ASE-CTR to generate the keys as required in the present embodiment and encrypt 5 pixels each time without disorder, two counters cnt_o2 and cnt_o3 may be employed for the first data sub-stream and two other counters cnt_e2 and cnt_e3 may be employed for the second data sub-stream, to control the generation of keys and the encryption of data streams. The two counters in each data sub-stream control the two keys in the third clock period respectively, to avoid a case that a previous key is covered by a next key while still being in use. Furthermore, various data, such as video data and island data may be processed separately using the counters cnt_o2, cnt_o3, cnt_e2 and cnt_e3.

FIG. 5 and FIG. 6 illustrate a procedure of generating and allocating the keys and the counters cnt_o2, cnt_o3, cnt_e2 and cnt_e3. In FIG. 5, a session key ks is a 128-bit pseudo-random code, which is used in a session key exchange (SKE) phase. Riv is a 64-bit pseudo-random code, which is used in the SKE phase. A counter inputCtr is a 64-bit counter and inputCtr=FrameNumber||DataNumber. FrameNumber denotes the number of frames which have been encrypted since the encryption is started, which has a 38-bit value and is added by one each time when a frame is encrypted. DataNumber has a 26-bit value and is added by one each time when a new 128-bit encrypt key is generated. The counter inputCtr is reset to be 0 each time when the first frame is started to be encrypted. A parameter 1c128 is a 128-bit constant. The keys are generated by the module AES_CTR in FIG. 5, and the encryption is performed by using the counters cnt_o2, cnt_o3, cnt_e2 and cnt_e3 as shown in FIG. 6. For example, the following codes show how to use the counters cnt_o2, cnt_o3, cnt_e2 and cnt_e3 in the encryption.

```
case(cnt_o2,cnt_o3)
4'b0100:                                           //encrypt P5, 1st
  enced_odd_data=enc_key0[23:0]^odd_data;          pixel in 2nd round
4'b1000:                                           //encrypt P1, 2nd
  enced_odd_data=enc_key1[47:24]^odd_data;         pixel in 1st round
4'b0001:                                           //encrypt P7, 3rd
  enced_odd_data=enc_key0[71:48]^odd_data;         pixel in 2nd round
4'b0010:                                           //encrypt P3, 4th
  enced_odd_data=enc_key1[96:49]^odd_data;         pixel in 1st round
4'b0011:                                           //encrypt P9, 5th
  enced_odd_data=enc_key0[119:97]^odd_data;        pixel in 2nd round
default :  enced_odd_data = enced_odd_data;
endcase
```

In this way, it is avoided that a previous key is covered by a next key while still being in use.

With the method according to the present embodiment, one key is produced for encrypting five pixels each time. In encrypting video data of pixels, the components of R, G and B or the components of Y, Cb and Cr of five pixels may be encrypted in a same one process. A mapping relation for encrypting the pixels is shown in Table 1. Table 1 specifically shows the encryption of video data of pixel 0. Bits key[7:0] are used for encrypting the component B[7:0] (in channel0) of pixel 0, bits key[15:8] are used for encrypting the component G[7:0] (in channel1) of pixel 0, and bits key[23:16] are used for encrypting the component R[7:0] (in channel2) of pixel 0. Other bits of the key are used for encrypting the next four pixels. The audio data are encrypted in a similar way except that the number of bits for encrypting the audio data is different from that for encrypting the video data. The island data and auxiliary data may be encrypted as shown in Table 2.

TABLE 1 mapping relation for encrypting video data streams

| Cipher Output | Pixel (Pixel0 is 1st 24-bit pixel value in time) | T.M.D.S. Channel | Video Stream Bits |
|---|---|---|---|
| 127:120 | <discard> | | |
| 119:96 | Pixel4 | as Pixel0 | as Pixel0 |
| 95:72 | Pixel3 | as Pixel0 | as Pixel0 |
| 71:48 | Pixel2 | as Pixel0 | as Pixel0 |
| 47:24 | Pixel1 | as Pixel0 | as Pixel0 |
| 23:16 | Pixel0 | 2 | Red[7:0] |
| 15:8 | Pixel0 | 1 | Green[7:0] |
| 7:0 | Pixel0 | 0 | Blue[7:0] |

TABLE 2 mapping relation for encrypting island data and auxiliary data

| Cipher Output: | Data (Data0 is 1st 24-bit data value in time) | Auxiliary Data Bits: |
|---|---|---|
| 127:120 | <discard> | |
| 119:96 | Data4 | as Data0 |
| 95:72 | Data3 | as Data0 |
| 71:48 | Data2 | as Data0 |
| 47:24 | Data1 | as Data0 |
| 23:20 | Data0 | Unused |
| 19 | Data0 | Channel 2 bit 3 |
| 18 | Data0 | Channel 2 bit 2 |
| 17 | Data0 | Channel 2 bit 1 |
| 16 | Data0 | Channel 2 bit 0 |
| 15:12 | Data0 | Unused |
| 11 | Data0 | Channel 1 bit 3 |
| 10 | Data0 | Channel 1 bit 2 |
| 9 | Data0 | Channel 1 bit 1 |
| 8 | Data0 | Channel 1 bit 0 |
| 7:3 | Data0 | Unused |
| 2 | Data0 | Channel 0 bit 2 |
| 1:0 | Data0 | Unused |

With the technical solution of the present embodiment, a process of 0.18 um may be employed to produce a digital circuit having a clock frequency of 300 MHz for encrypting pixels with HDCP 2.2. Compared with a deep submicron process for producing a digital circuit having a clock frequency of 600 MHz, the encryption can be performed with a process having a lower requirement, thereby reducing the cost of a process for encrypting signals of HDMI 2.0 with HDCP 2.2, significantly shortening time for designing digital backend, P&R and layout, simplifying the implementation and lowering the difficulty of development.

Figure 7:
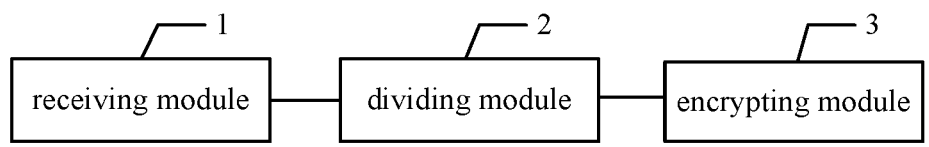
FIG. 7 is a structural schematic diagram of a system for encrypting a data stream according to an embodiment of the present disclosure.

FIG. 7 is a structural schematic diagram of a system for encrypting a data stream according to an embodiment of the present disclosure.

Referring to FIG. 7, the system for encrypting a data stream according to the embodiment of the present disclosure includes a receiving module 1, a dividing module 2 and an encrypting module 3.

The receiving module 1 is configured to receive a multimedia data stream including multiple data elements.

The dividing module 2 is configured to divide the multimedia data stream into M data sub-streams based on sequence of the multiple data elements in the multimedia data stream. The M data sub-streams follow a synchronous clock period which is M times of a clock period of the multimedia data stream, where M is a positive integer greater than 1.

The encrypting module 3 is configured to generate a key at a predetermined time interval, and encrypt the data elements in the M data sub-streams with the key. The predetermined time interval is N times of the clock period of the M data sub-streams, where N is a positive integer.

Preferably, M is set to be 2.

Accordingly, the dividing module 2 includes a determining unit and a grouping unit.

The determining unit is configured to determine the data elements at odd positions in the multimedia data stream and the data elements at even positions in the multimedia data stream based on the sequence of the multiple data elements in the multimedia data stream.

The grouping unit is configured to group the data elements at odd positions in the multimedia data stream into a first data sub-stream, and group the data elements at even positions in the multimedia data stream into a second data sub-stream.

Preferably, the encrypting module 3 is specifically configured to generate the key at the predetermined time interval starting from a first clock period of the data sub-stream, and encrypt the multiple data elements with the generated key based on the sequence of the multiple data elements in the multimedia data stream, where S data elements of the multiple data elements are encrypted each time, where S is a positive integer.

Preferably, N is set to be 2 and 3 alternately, and S is set to be 5.

Preferably, each of the data sub-streams includes video data, audio data, auxiliary data and control data. The video data includes video components of R, G and B, or video components of Y, Cb and Cr.

It should be noted that, the above method for encrypting a data stream according to the above embodiments may be applied in the system for encrypting a data stream in the present embodiment to achieve all the above technical solutions. The various functional modules may perform their functions as described in the above method embodiments, which will not be described herein.

In the method and the system for encrypting a data stream provided according to the embodiments of the present disclosure, a multimedia data stream including multiple data elements is received. The multimedia data stream is divided into M data sub-streams based on sequence of the multiple data elements in the multimedia data stream. The M data sub-streams follow a synchronous clock period which is M times of a clock period of the multimedia data stream, where M is a positive integer greater than 1. A key is generated at a predetermined time interval, and the data elements in the M data sub-streams are encrypted with the key. The predetermined time interval is N times of the clock period of the M data sub-streams, where N is a positive integer. It follows that, with the technical solution provided according to the present disclosure, the multimedia data stream is divided into M data sub-streams following a clock period which is M times of a clock period of the multimedia data stream, and then the data elements in the M data sub-streams are encrypted with the key. In this way, the data elements can be encrypted with a clock frequency lower than the clock frequency of the multimedia data stream. Therefore, the encryption can be performed with a process having lower requirements, thereby reducing the cost of a process for encrypting signals of HDMI 2.0 with MCP 2.2, simplifying the implementation and lowering the difficulty of development.

The above system is divided into various functional modules for convenient description. It is apparent that the various functional modules may be implemented in same one or different software and/or hardware.

The embodiments of the present disclosure are described herein in a progressive manner, with an emphasis placed on explaining the difference between each embodiment and the other embodiments. Hence, for the same or similar parts among the embodiments, they can be referred to from one another. For the system disclosed in the embodiments, the corresponding descriptions are relatively simple because the system corresponds to the methods disclosed in the embodiments. The relevant portions may be referred to the description for the method parts. It also should be illustrated that the system embodiment described above is just schematic, a unit described as a separate component may be or may not be separated in physical, a component displayed as a unit may be or may not be a physical unit, that is, may be placed in a same position or may be distributed in multiple network units. A part of or all modules may be selected if desired to realize the object of the embodiments. Those skilled in the art can understand and implement the embodiments without any creative work.

It may be known by those skilled in the art that, units and steps described in conjunction with the embodiments disclosed herein can be realized by electronic hardware, computer software or a combination thereof. In order to clearly illustrate interchangeability of the hardware and the software, steps and composition of each embodiment have been described generally in view of functions in the above specification. Whether the function is executed in a hardware way or in a software way depends on applications of the technical solution and design constraint conditions. Those skilled in the art can use different method for each application to realize the described function, and this is not considered to be beyond the scope of the present disclosure.

The steps of the methods or algorithms described in conjunction with the embodiments of the present disclosure can be implemented with hardware, software modules executed by a processor, or a combination thereof. The software modules may reside in a Random Access Memory (RAM), an internal memory, a Read Only Memory (ROM), an Electrically Programmable ROM, an Electrically-Erasable Programmable ROM, a register, a hard disk, a removable disk drive, a CD-ROM, or other types of storage media well known in the technical field.

With the above descriptions of the disclosed embodiments, those skilled in the art may practice or use the present disclosure. Various modifications to the embodiments are apparent for those skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. A method for encrypting a data stream, comprising:
receiving a multimedia data stream comprising a plurality of data elements;
dividing the multimedia data stream into M data sub-streams based on sequence of the plurality of data elements in the multimedia data stream, wherein the M data sub-streams follow a synchronous clock period which is M times of a clock period of the multimedia data stream, where M is a positive integer greater than 1;
generating a key at a predetermined time interval, and encrypting the data elements in the M data sub-streams with the key, wherein the predetermined time interval is N times of the clock period of the M data sub-streams, where N is a positive integer; and
outputting the M data sub-streams encrypted with a clock frequency lower than the clock frequency of the multimedia data stream.

2. The method according to claim 1, wherein M is set to be 2 and the dividing the multimedia data stream into M data sub-streams based on sequence of the plurality of data elements in the multimedia data stream comprises:
determining the data elements at odd positions in the multimedia data stream and the data elements at even positions in the multimedia data stream based on the sequence of the plurality of data elements in the multimedia data stream; and
grouping the data elements at odd positions in the multimedia data stream into a first data sub-stream, and grouping the data elements at even positions in the multimedia data stream into a second data sub-stream.

3. The method according to claim 2, wherein the generating a key at a predetermined time interval and encrypting the data elements in the M data sub-streams with the key comprises:
generating the key at the predetermined time interval starting from a first clock period of the data sub-stream and encrypting the plurality of data elements with the generated key based on the sequence of the plurality of data elements in the multimedia data stream, wherein S data elements of the plurality of data elements are encrypted each time, where S is a positive integer.

4. The method according to claim 3, wherein N is set to be 2 and 3 alternately, and S is set to be 5.

5. The method according to claim 1, wherein the generating a key at a predetermined time interval and encrypting the data elements in the M data sub-streams with the key comprises:
generating the key at the predetermined time interval starting from a first clock period of the data sub-stream and encrypting the plurality of data elements with the generated key based on the sequence of the plurality of data elements in the multimedia data stream, wherein S data elements of the plurality of data elements are encrypted each time, where S is a positive integer.

6. The method according to claim 5, wherein N is set to be 2 and 3 alternately, and S is set to be 5.

7. The method according to claim 1, wherein each of the data sub-streams comprises video data, audio data, auxiliary data and control data; and the video data comprises video components of R, G and B, or video components of Y, Cb and Cr.

8. A system for encrypting a data stream, comprising a processor and a memory for storing instructions, wherein when the instructions are performed by the processor, the following operations are performed:
receiving a multimedia data stream comprising a plurality of data elements;
dividing the multimedia data stream into M data sub-streams based on sequence of the plurality of data elements in the multimedia data stream, wherein the M data sub-streams follow a synchronous clock period which is M times of a clock period of the multimedia data stream, where M is a positive integer greater than 1; and
generating a key at a predetermined time interval, encrypting the data elements in the M data sub-streams with the key, and outputting the M data sub-streams encrypted with a clock frequency lower than the clock frequency of the multimedia data stream, wherein the predetermined time interval is N times of the clock period of the M data sub-streams, where N is a positive integer.

9. The system according to claim 8, wherein M is set to be 2 and the dividing the multimedia data stream into M data sub-streams based on sequence of the plurality of data elements in the multimedia data stream comprises:
determining the data elements at odd positions in the multimedia data stream and the data elements at even positions in the multimedia data stream based on the sequence of the plurality of data elements in the multimedia data stream; and
grouping the data elements at odd positions in the multimedia data stream into a first data sub-stream, and grouping the data elements at even positions in the multimedia data stream into a second data sub-stream.

10. The system according to claim 9, wherein the encrypting the data elements in the M data sub-streams with the key comprises:
- generating the key at the predetermined time interval starting from a first clock period of the data sub-stream and encrypting the plurality of data elements with the generated key based on the sequence of the plurality of data elements in the multimedia data stream, wherein S data elements of the plurality of data elements are encrypted each time, where S is a positive integer.

11. The system according to claim 10, wherein N is set to be 2 and 3 alternately, and S is set to be 5.

12. The system according to claim 8, wherein the encrypting the data elements in the M data sub-streams with the key comprises:
- generating the key at the predetermined time interval starting from a first clock period of the data sub-stream and encrypting the plurality of data elements with the generated key based on the sequence of the plurality of data elements in the multimedia data stream, wherein S data elements of the plurality of data elements are encrypted each time, where S is a positive integer.

13. The system according to claim 12, wherein N is set to be 2 and 3 alternately, and S is set to be 5.

14. The system according to claim 8, wherein each of the data sub-streams comprises video data, audio data, auxiliary data and control data; and the video data comprises video components of R, G and B, or video components of Y, Cb and Cr.

* * * * *